(12) United States Patent
Sumanasekara et al.

(10) Patent No.: US 12,523,977 B2
(45) Date of Patent: Jan. 13, 2026

(54) STAGING ALGORITHM FOR TWO STAGE HEATING/COOLING EQUIPMENT

(71) Applicant: Johnson Controls Tyco IP Holdings LLP, Milwaukee, WI (US)

(72) Inventors: D Gamage Methmini U M Sumanasekara, Wichita, KS (US); Andrew M. Boyd, Wichita, KS (US); Theresa N. Gillette, Wichita, KS (US)

(73) Assignee: Johnson Controls Light Commercial IP GmbH, Shaffhausen (CH)

( * ) Notice: Subject to any disclaimer, the term of this patent is extended or adjusted under 35 U.S.C. 154(b) by 0 days.

(21) Appl. No.: 18/201,026

(22) Filed: May 23, 2023

(65) Prior Publication Data
US 2023/0350370 A1    Nov. 2, 2023

Related U.S. Application Data

(63) Continuation of application No. 17/151,186, filed on Jan. 17, 2021, now Pat. No. 11,656,590.

(51) Int. Cl.
*F24F 11/65* (2018.01)
*G05B 19/042* (2006.01)

(52) U.S. Cl.
CPC ............ *G05B 19/042* (2013.01); *F24F 11/65* (2018.01); *G05B 2219/2614* (2013.01)

(58) Field of Classification Search
CPC . G05B 19/042; G05B 2219/2614; F24F 11/65
See application file for complete search history.

(56) References Cited

U.S. PATENT DOCUMENTS

| | | |
|---|---|---|
| 5,340,028 A | 8/1994 | Thompson |
| 6,705,533 B2 | 3/2004 | Casey et al. |
| 7,731,096 B2 | 6/2010 | Lorenz et al. |
| 8,275,484 B2 | 9/2012 | Lorenz et al. |
| 8,382,003 B2 | 2/2013 | Grohman |
| 9,212,821 B2 | 12/2015 | Broker et al. |
| 2005/0092317 A1 | 5/2005 | Hugghins et al. |
| 2010/0009302 A1 | 1/2010 | Nordberg et al. |
| 2017/0089603 A1* | 3/2017 | Bentz ..................... F24F 11/871 |

* cited by examiner

*Primary Examiner* — Michael W Choi
(74) *Attorney, Agent, or Firm* — Kelly McGlashen

(57) ABSTRACT

A system includes a two stage heat exchanger and a processor. The processor is configured to receive a call from a thermostat and execute, in response to the call, an adaptive staging algorithm. The adaptive staging algorithm is configured to determine, in response to a recent cycle of the two stage heat exchanger being a first stage cycle, a first stage up time of the two stage heat exchanger as a first function of a first value, the first value corresponding to the recent cycle being the first stage cycle. The adaptive staging algorithm is also configured to determine, in response to the recent cycle of the two stage heat exchanger being a second stage cycle, a second stage up time of the two stage heat exchanger as a second function of a second value, the second value corresponding to the recent cycle being the second stage cycle, where the first and second values are different.

20 Claims, 8 Drawing Sheets

FIG. 7

170 — VALUES ASSIGNED TO $S_1$ CYCLES

| 5TH LATEST CYCLE | 4TH LATEST CYCLE | 3RD LATEST CYCLE | 2ND LATEST CYCLE | 1ST LATEST CYCLE | MINIMUM POSSIBLE WEIGHED SUM ($WS_{MIN}$) |
|---|---|---|---|---|---|
| $A_1$ | $B_1$ | $C_1$ | $D_1$ | $E_1$ | $WS_{MIN} = A_1 + B_1 + C_1 + D_1 + E_1$ |

180 — VALUES ASSIGNED TO $S_2$ CYCLES

| 5TH LATEST CYCLE | 4TH LATEST CYCLE | 3RD LATEST CYCLE | 2ND LATEST CYCLE | 1ST LATEST CYCLE | MINIMUM POSSIBLE WEIGHED SUM ($WS_{MAX}$) |
|---|---|---|---|---|---|
| $A_2$ | $B_2$ | $C_2$ | $D_2$ | $E_2$ | $WS_{MAX} = A_2 + B_2 + C_2 + D_2 + E_2$ |

190 — TEST CASE - WEIGHED SUM

| 5TH LATEST CYCLE = $S_1$ | 4TH LATEST CYCLE = $S_1$ | 3RD LATEST CYCLE = $S_2$ | 2ND LATEST CYCLE = $S_2$ | 1ST LATEST CYCLE = $S_2$ | WEIGHED SUM (WS) |
|---|---|---|---|---|---|
| $A_1$ | $B_1$ | $C_2$ | $D_2$ | $E_2$ | $WS = A_1 + B_1 + C_2 + D_2 + E_2$ |

STAGING ALGORITHM FOR TWO STAGE HEATING/COOLING EQUIPMENT

CROSS REFERENCE TO RELATED APPLICATIONS

This application is a continuation of U.S. patent application Ser. No. 17/151,186, entitled "STAGING ALGORITHM FOR TWO STAGE HEATING/COOLING EQUIPMENT," filed Jan. 17, 2021, which is hereby incorporated by reference in its entirety for all purposes.

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments (e.g., enclosed spaces). For example, an HVAC system may include several heat exchangers, such as a heat exchanger configured to place an air flow in a heat exchange relationship with a refrigerant of a vapor compression circuit (e.g., evaporator, condenser), a heat exchanger configured to place an air flow in a heat exchange relationship with combustion products (e.g., a furnace), or both. In general, the heat exchange relationship(s) may cause a change in pressures and/or temperatures of the air flow, the refrigerant, the combustion products, or any combination thereof. The air flow may be directed toward the environment (e.g., enclosed space) to change a temperature of the environment. Control features may be employed to control the above-described features such that the temperature of the environment reaches a target temperature.

A two stage heat exchanger, such as a two stage furnace, may be employed to provide heating or cooling at a faster rate and/or more efficiently than a single stage heat exchanger. The two stage heat exchanger may include a first stage operating mode that causes a relatively low heat output or heating rate and a second stage operating mode that causes a relatively high heat output or heating rate. In the context of a furnace, for example, first stage operation may cause a first amount of fuel (e.g., gas) to be directed to burners of the furnace for generating combustion products that provide a first amount of heat over a period of time. Second stage operation may cause a second amount of fuel (e.g., gas) to be directed to the burners of the furnace for generating combustion products providing a second amount of heat over a comparable period of time, where the second amount of fuel is greater than the first amount of fuel and the second amount of heat is greater than the first amount of heat. Other aspects of the furnace, such as speeds of a draft inducing fan or blower that biases the combustion products through heat exchange tubes or coils of the furnace, may be controlled to accommodate the first stage operating mode and the second stage operating mode.

The two stage heat exchanger may be controlled by a controller that receives a call from a thermostat and determines, in response to the call, if and when to operate the two stage heat exchanger in the second stage operating mode. Unfortunately, traditional systems may be ill-equipped for determining if and when to initiate second stage operation of the two stage heat exchanger, leading to inefficient heat exchange and/or lengthy amounts of time to condition the environment (e.g., enclosed space) until the call from the thermostat is satisfied. Further, traditional systems may suffer from compatibility issues associated with certain traditional thermostats and certain two stage heat exchangers. Accordingly, it is now recognized that improved operation of two stage heat exchangers (e.g., cooling and heating equipment, such as a furnace) is desired.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a heating, ventilation, and/or air conditioning (HVAC) system includes a two stage heat exchanger and a processor. The processor is configured to receive a call from a thermostat and execute, in response to the call, an adaptive staging algorithm. The adaptive staging algorithm is configured to determine, in response to a recent cycle of the two stage heat exchanger being a first stage cycle, a first stage up time of the two stage heat exchanger as a first function of a first value, the first value corresponding to the recent cycle being the first stage cycle. The adaptive staging algorithm is also configured to determine, in response to the recent cycle of the two stage heat exchanger being a second stage cycle, a second stage up time of the two stage heat exchanger as a second function of a second value, the second value corresponding to the recent cycle being the second stage cycle, where the first and second values are different.

In another embodiment, a two stage heat exchanger includes heat exchange tubes configured to receive a heat exchange fluid at a first flow rate corresponding to first stage operation of the two stage heat exchanger and at a second flow rate corresponding to second stage operation of the two stage heat exchanger, the second flow rate being greater than the first flow rate. The two stage heat exchanger also includes a processor configured to receive a call from a thermostat. The processor is configured to, in response to the call, determine whether a recent cycle of the two stage heat exchanger was a first stage cycle corresponding to the first stage operation or a second stage cycle corresponding to the second stage operation. The processor is also configured to, in response to the call, determine a stage up time of the two stage heat exchanger as a function of a first value if the recent cycle was the first stage cycle or a second value if the recent cycle was the second stage cycle, the second value being greater than the first value.

In another embodiment, a controller is configured to control aspects of a two stage heat exchanger. The controller includes non-transitory, computer-readable media (e.g., a memory) having instructions stored thereon that, when executed by a processor of the controller, are configured to cause the controller to determine, in response to a call from a thermostat, whether a most recent cycle of the two stage heat exchanger was a first stage cycle corresponding to first stage operation of the two stage heat exchanger or a second stage cycle corresponding to second stage operation of the two stage heat exchanger, and to determine a stage up time of the two stage heat exchanger as a function of a first value if the recent cycle was the first stage cycle or a second value if the recent cycle was the second stage cycle, the second value being greater than the first value.

BRIEF DESCRIPTION OF THE DRAWINGS

Various aspects of this disclosure may be better understood upon reading the following detailed description and upon reference to the drawings in which:

FIG. 7 is an illustration of tables including values utilized for determining a weighted sum and a weighted percentage based on most recent cycles of, for example, the furnace of FIG. 5, in accordance with an aspect of the present disclosure;

DETAILED DESCRIPTION

Figure 1:
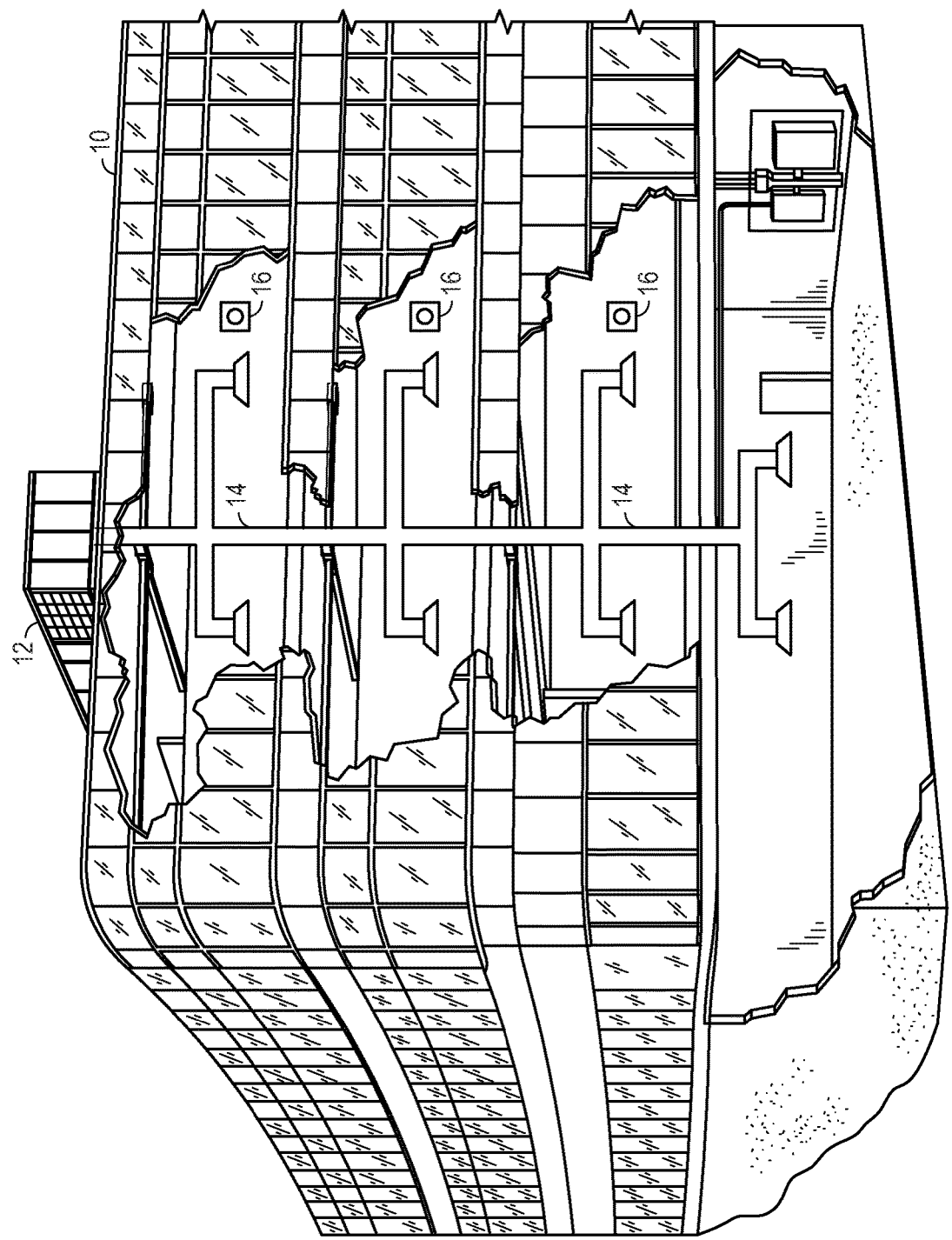
FIG. 1 is a perspective view of a building having a heating, ventilation, and/or air conditioning (HVAC) system for environmental management that may employ one or more HVAC units, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to two stage heat exchangers and, more specifically, staging controls of the two stage heat exchangers. For example, the present disclosure includes an adaptive staging algorithm employed for operating a two stage heat exchanger, such as a furnace, to determine if and when to initiate second stage operation of the two stage heat exchanger.

In accordance with present embodiments, a two stage heat exchanger, such as a two stage furnace, may be controlled to operate in a first stage operating mode providing a first amount of heat over a period of time and a second stage operating mode providing a second amount of heat over a comparable (e.g., same or similar) period of time, the second amount being greater than the first amount. While two stage furnaces are described in detail below, it should be understood that the adaptive staging algorithm described by in the present disclosure is also applicable to two stage cooling equipment, such as a refrigerant-based evaporator configured to absorb heat from an air flow, or two stage heating equipment besides a furnace, such as an electric heater.

The two stage furnace may include one or more burners configured to receive fuel (e.g., gas) from a fuel source. A fuel valve (e.g., gas valve) associated with the two stage furnace may be controlled to supply a first amount of fuel (or first fuel rate) to the burner corresponding to the first stage operating mode, and a second amount of fuel (or second fuel rate) to the burner corresponding to the second stage operating mode, where the second amount of fuel or the second fuel rate is greater than the first amount of fuel or first fuel rate. The burners may also receive an oxidant and may ignite a fuel-oxidant mixture to generate combustion products routed through heat exchange tubes or coils of the two stage furnace. The first stage operating mode may generate a smaller amount of combustion products than the second stage operating mode based on the above-described differences in fuel amount or fuel rate. A controller of the two stage furnace may determine if and when second stage operation should be initiated. For example, in certain conditions, second stage operation, which provides a greater amount of combustion products than first stage operation, may enable temperature control of the environment (e.g., enclosed space) at a faster rate than first stage operation. Further, in certain conditions, first stage operation, which provides a lesser amount of combustion products than second stage operation, may enable temperature control of the environment (e.g., enclosed space) in a less expensive or more efficient manner. In general, the controller may determine if and when to initiate second stage operation of the two stage furnace in order to strike a balance between conditioning efficiency and conditioning speed.

In certain traditional systems, two stage heat exchangers, such as two stage furnaces, may be incompatible with single stage thermostats that were designed for single stage heat exchangers. Further, in certain traditional systems, two stage heat exchangers, such as two stage furnaces, may be compatible with single stage thermostats but may include controls that are ill-equipped for determining if and when to initiate second state operation in a manner that provides efficient and timely temperature control of the environment (e.g., enclosed space). Further still, in certain traditional systems, two stage heat exchangers, such as two stage furnaces, may be interface with two stage thermostats, but control aspects associated with the two stage furnace and two stage thermostat may nevertheless be ill-equipped for determining if and when to initiate second state operation in a manner that provides efficient and timely temperature control of the environment (e.g., enclosed space).

In accordance with present embodiments, a controller of the two stage furnace may receive a call from a thermostat (e.g., single stage thermostat or two stage thermostat). The controller may include a processor and a memory, where the memory includes instructions stored thereon that, when executed by the processor, cause the controller to execute an adaptive staging algorithm and, based on an output from the adaptive staging algorithm, determine a stage up time during which the two stage furnace is operated in the first stage operating mode and after which the two stage furnace is operated in the second stage operating mode (e.g., unless the call from the thermostat is satisfied by the first stage operating mode prior to the stage up time expiring). For example, if the calculated stage up time is 12 minutes, the two stage furnace is controlled to operate in the first stage operating mode for at most 12 minutes, and if the call from the thermostat is not satisfied by the first stage operating mode before or by the 12 minutes expire, then the two stage furnace is controlled to operate in the second stage operating mode until the call from the thermostat is satisfied.

The adaptive staging algorithm may take into account whether the second stage operating mode was initiated in recent cycles of the two stage furnace. In accordance with the present disclosure, the term cycle refers to a time period beginning when operation of the furnace is initiated in response to a first thermostat call and ending when a second thermostat call after the first thermostat call is received. In the adaptive staging algorithm, each previously satisfied call from the thermostat may be associated with a cycle of the two stage furnace that was used to satisfy the call. If the two stage furnace satisfied a previous call from the thermostat via only stage one operation, the cycle associated with the previous call is considered a first stage cycle. If the two stage furnace satisfied a previous call from the thermostat after initiating second stage operation, the cycle associated with the previous call is considered a second stage cycle. Values assigned to first stage cycles and additional values assigned to second stage cycles may be employed in the input. A first stage cycle refers to a cycle that was completed without initiating second stage operation. A second stage cycle refers to a cycle that was completed after initiating second stage operation (e.g., including first stage operation and second stage operation). Certain of the values assigned to second stage cycles may be greater than certain of the values assigned to first stage cycles. For example, a fifth most recent cycle that corresponds to a second stage cycle may be greater than a fifth most recent cycle that corresponds to a first stage cycle. Further, the values assigned to more recent cycles (e.g., first most recent cycle) may be greater than the values assigned to less recent cycles (e.g., fifth most recent cycle).

The above-described input may be a function of a weighted sum of the above-described values. For example, the controller may determine that the most recent cycle was a second stage cycle, the second most recent cycle was a second stage operation, the third most recent cycle was a third stage cycle, and so on and so forth. The controller may then sum the above-described values that are associated with the above-described cycles. Because the values are greater for second stage operation than first stage operation, and because the values are greater for more recently cycles than for less recent cycles, the sum is referred to herein as a weighted sum. The controller may employ the weighted sum in the adaptive staging algorithm, along with one or more other inputs, described in detail below with reference to the drawings. In general, the above-described weighting technique and corresponding adaptive staging algorithm improve heat exchange efficiency and/or reduce conditioning time relative to traditional embodiments.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration loop to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
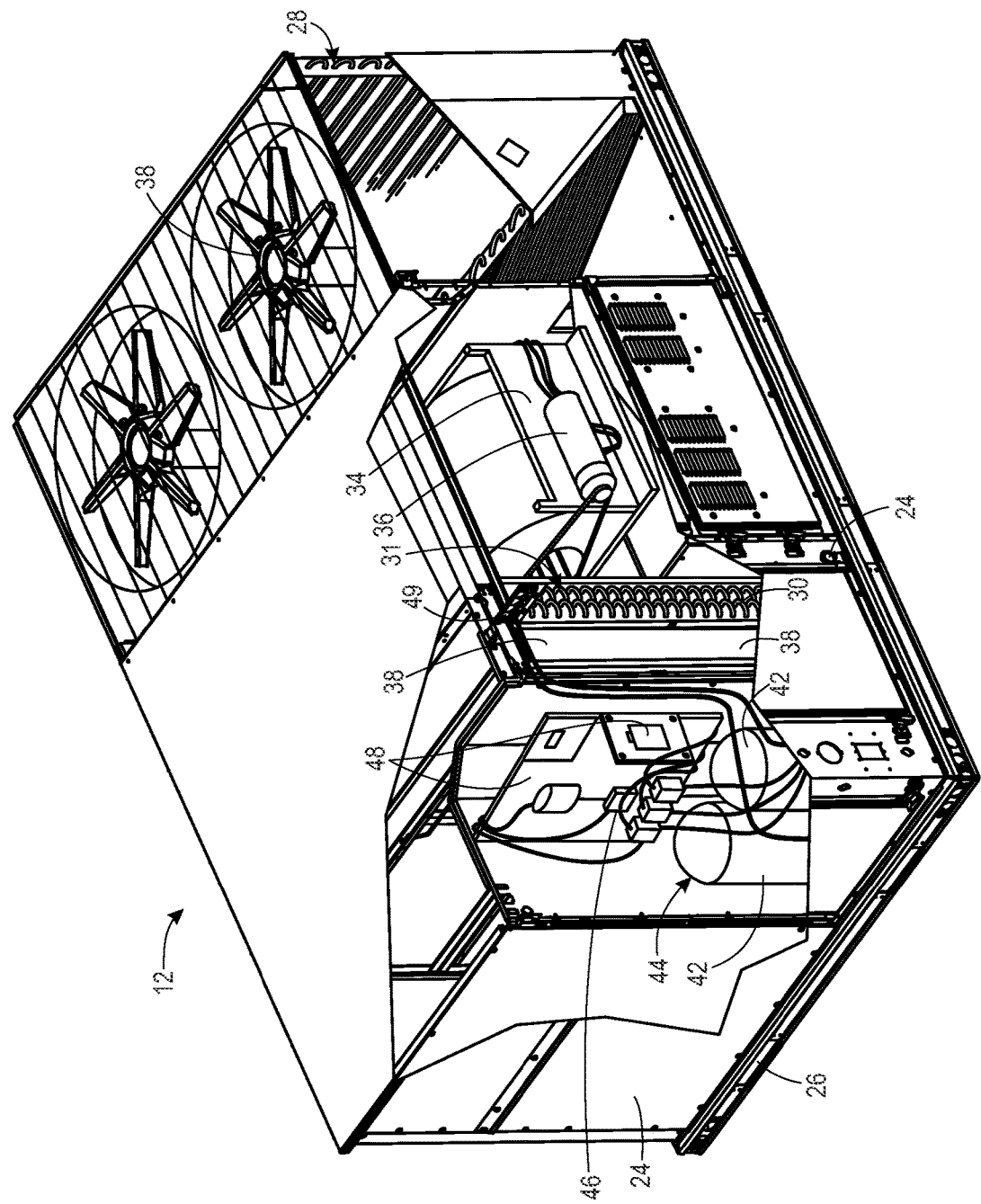
FIG. 2 is a perspective view of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit onto "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal loop in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10.

While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal loop. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. Additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
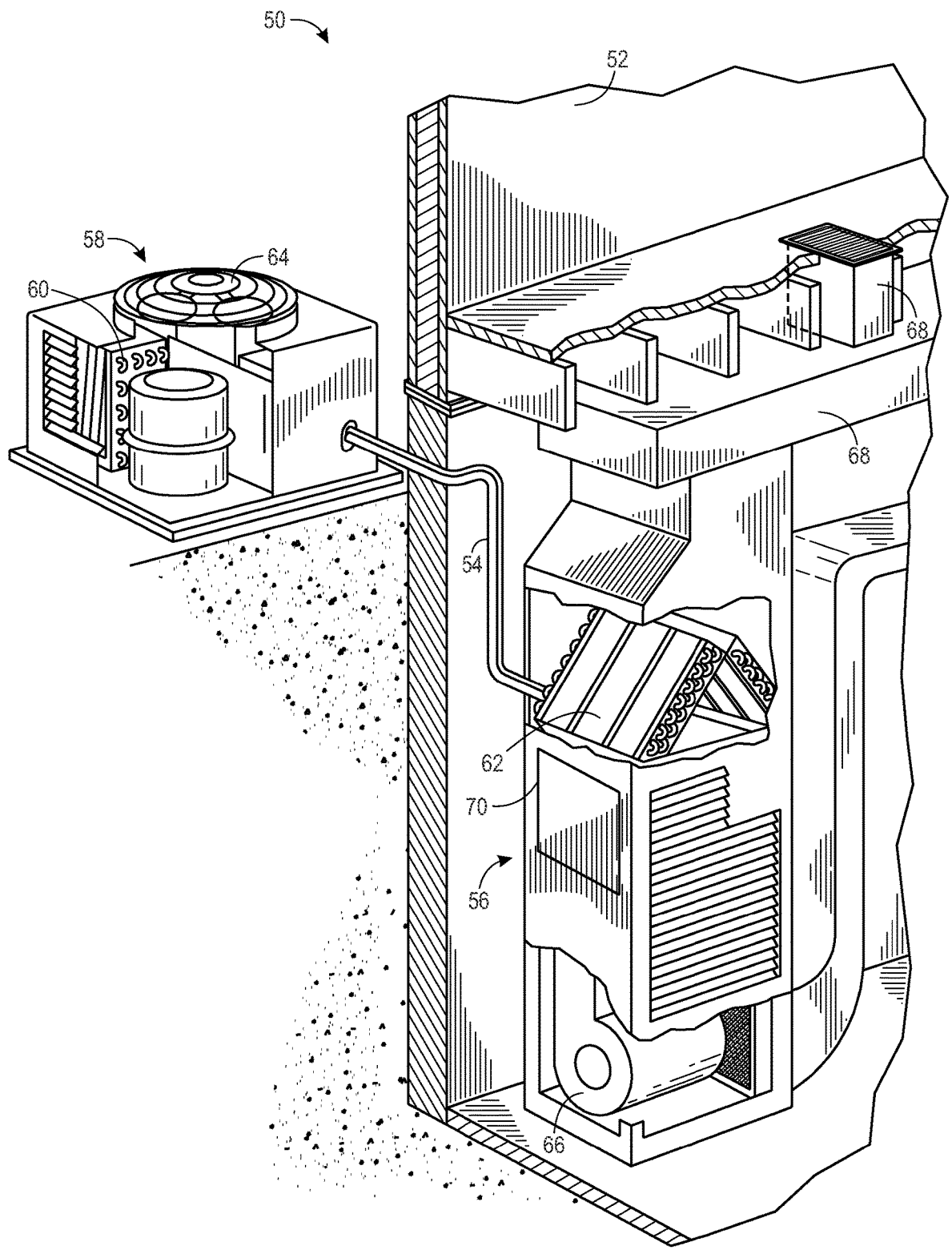
FIG. 3 is a cutaway perspective view of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration loop temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger, separate from heat exchanger 62, such that air directed by the blower or fan 66 passes over the tubes or pipes and extracts heat from the combustion products. The heated air may then be routed from the furnace system 70 to the ductwork 68 for heating the residence 52.

Figure 4:
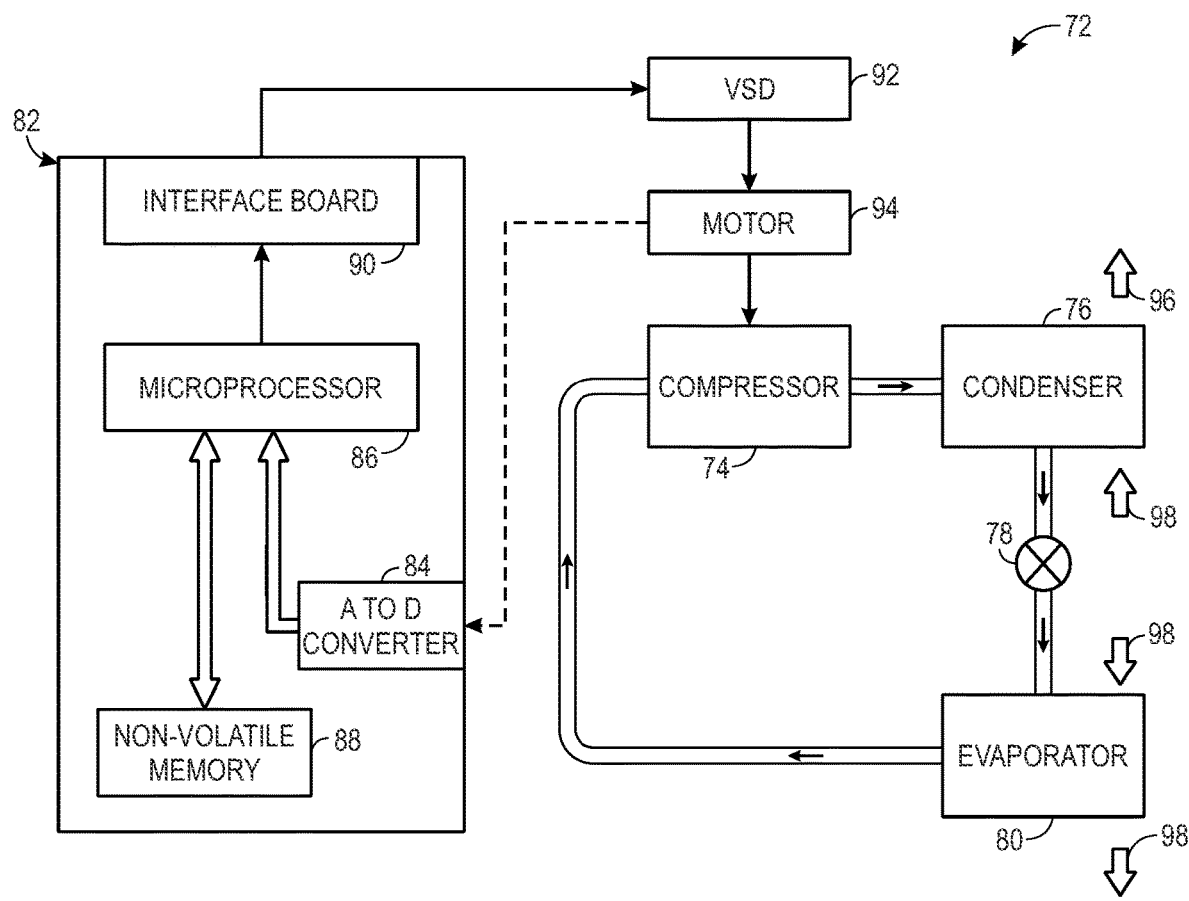
FIG. 4 is a schematic illustration of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the loop.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

Any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Further, any of the systems illustrated in FIGS. 1-4 may include a two stage heat exchanger and a controller that employs an adaptive staging algorithm for determining if and when to initiate second stage operation of the two stage heat exchanger. As previously described, a two stage heat exchanger, such as a two stage furnace, may be controlled to operate in a first stage operating mode providing a first amount of heat over a period of time and a second stage operating mode providing a second amount of heat over a comparable (e.g., same or similar) period of time, the second amount being greater than the first amount. While two stage furnaces are described in detail below, it should be understood that the adaptive staging algorithm described by in the present disclosure is also applicable to two stage cooling equipment, such as a refrigerant-based evaporator configured to absorb heat from an air flow, or two stage heating equipment besides a furnace, such as an electric heater.

The two stage furnace may include one or more burners configured to receive fuel (e.g., gas) from a fuel source. A fuel valve (e.g., gas valve) associated with the two stage furnace may be controlled to supply a first amount of fuel (or first fuel rate) to the burner corresponding to the first stage operating mode, and a second amount of fuel (or second fuel rate) to the burner corresponding to the second stage operating mode, where the second amount of fuel or the second fuel rate is greater than the first amount of fuel or first fuel rate. The burners may also receive an oxidant and may ignite a fuel-oxidant mixture to generate combustion products routed through heat exchange tubes or coils of the two stage furnace. The first stage operating mode may generate a smaller amount of combustion products than the second stage operating mode based on the above-described differences in fuel amount or fuel rate. A controller of the two stage furnace may determine if and when second stage operation should be initiated. For example, in certain conditions, second stage operation, which provides a greater amount of combustion products than first stage operation, may enable temperature control of the environment (e.g., enclosed space) at a faster rate than first stage operation. Further, in certain conditions, first stage operation, which provides a lesser amount of combustion products than second stage operation, may enable temperature control of the environment (e.g., enclosed space) in a less expensive or more efficient manner. In general, the controller may execute an adaptive staging algorithm in accordance with the present disclosure to determine if and when to initiate second stage operation of the two stage furnace in order to strike a balance between conditioning efficiency and conditioning speed. The adaptive staging algorithm and associated controls may enable improved heat exchange efficiency and time. The above-described features are described in detail below with reference to FIGS. 5-10.

Figure 5:
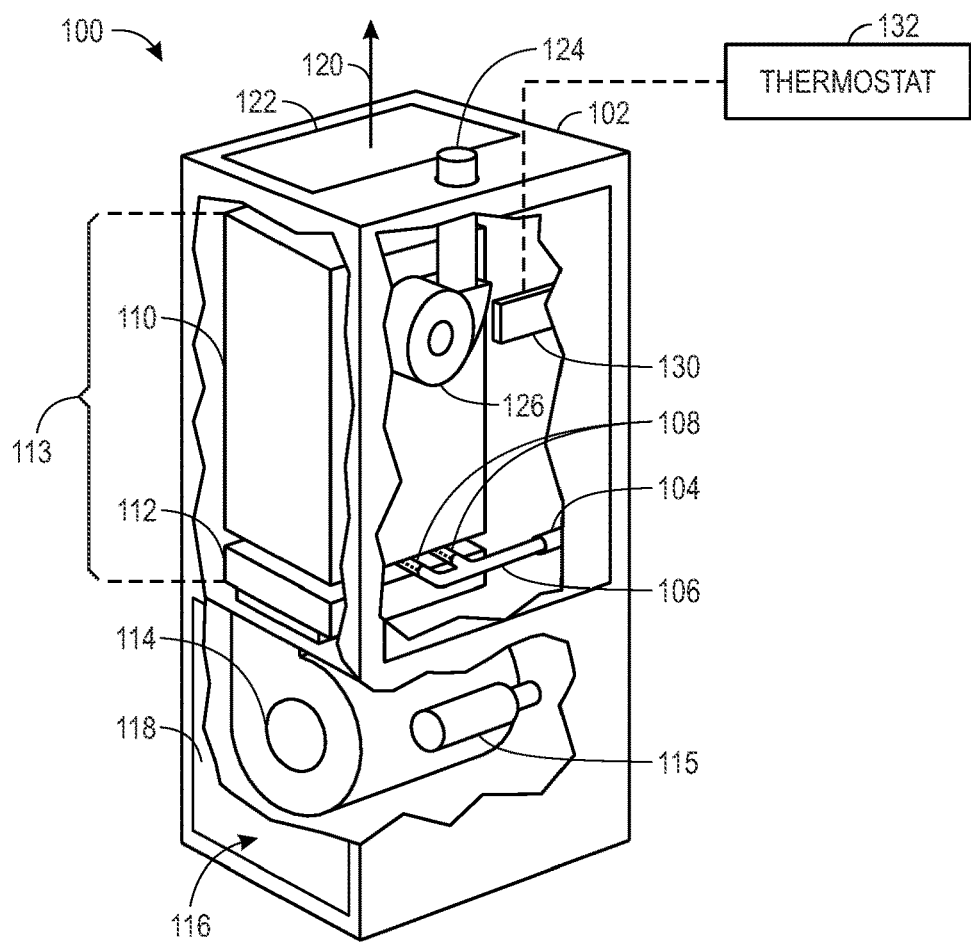
FIG. 5 is a perspective view of a furnace capable of inclusion in any of the systems or units illustrated in FIGS. 1-4, the furnace having a controller being coupled to a thermostat, in accordance with an aspect of the present disclosure.

FIG. 5 is a perspective view of an embodiment of a furnace 100 capable of inclusion in any of the systems or units illustrated in FIGS. 1-4, the furnace 100 having a controller 130 being coupled to a thermostat 132. In the illustrated embodiment, the furnace 100 includes a housing 102 in which or on which a number of components of the furnace 100 are disposed. For example, the furnace 100 includes a fuel valve 104 (referred to in certain instances below as a gas valve) controllable to supply amounts of fuel (e.g., gas) through piping 106 to one or more burners 108 of the furnace 100. The burner 108 are configured to combust a mixture of the fuel (e.g., gas) and oxidant to generate combustion products routed through a primary heat exchanger 110 (e.g., primary heat exchange tubes or coils) and a secondary heat exchanger 112 (e.g., secondary heat exchange tubes or coils). The primary heat exchanger 112 and the secondary heat exchanger 112 may collectively be referred to as a heat exchange assembly 113.

In some embodiments, the primary heat exchanger 100 is fluidly coupled with the secondary heat exchanger 112 such that the combustion products are passed from the primary heat exchanger 100 to the secondary heat exchanger 112. Further, in some embodiments, the tubes or coils associated with the primary heat exchanger 110 may differ in size, shape, or material from the tubes or coils associated with the secondary heat exchanger 112. A fan 114 (e.g., circulating fan) of the furnace 100, driven by a motor 115 (e.g., electric blower motor), may draw a cold air flow 116 into the furnace 100, for example through a filter 118 of the furnace 100, such that the cold air flow 116 can be directed over the primary heat exchanger 110 and the secondary heat exchanger 112. The combustion products passing through the primary heat exchanger 110 and the secondary heat exchanger 112 may heat the cold air flow 116 to convert the cold air flow 116 to a heated air flow 120 that is passed from an outlet 122 of the furnace 100 to a duct associated with the building in which the furnace 100 is employed. The duct may be a part of ductwork that directs the heated air flow 120 toward an environment (e.g., enclosed space) conditioned by the furnace 100 and/or other HVAC componentry.

The furnace 100 also includes a vent 124 (e.g., piping, such as polyvinyl chloride [PVC] piping or acrylonitrile butadiene styrene [ABS] plastic piping) fluidly coupled with the heat exchange assembly 113. For example, a draft inducing fan 126 may be coupled to, and between, the heat exchange assembly 113 and the vent 124. The draft inducing fan 126 may be configured to draw the combustion products through the tubes or coils of the heat exchange assembly 113 and pass the combustion products to the vent 124, which vents the combustion products to an external (e.g., ambient) environment outside of the building serviced by the furnace 100.

A controller 130 of the furnace 100 may be employed to control operation of the various above-described components of the furnace 100. The illustrated controller 130 is disposed inside the housing 102 of the furnace 100, but it should be understood that the controller 130 may be disposed on the housing 102 (e.g., on an external surface of the housing 102), in another location separate from the furnace 100, or in a different location of the housing 102 than shown in the illustrated embodiment. In accordance with present embodiments, the controller 130 may be configured to execute an adaptive staging algorithm to determine if and when to initiate a second stage operating mode of the furnace 100.

For example, the illustrated furnace 100 may include a first stage operating mode in which a first amount of fuel (e.g., gas) is directed to the burners 108 of the furnace 100, by way of the gas valve 104 and the piping 106, for generating a first amount of combustion products that provide a first amount of heat over a period of time. The furnace 100 may also include a second stage operating mode in which a second amount of fuel (e.g., gas) is directed to the burners 108 of the furnace 100, by way of the gas valve 104 and the piping 106, for generating a second amount of combustion products that provide a second amount of heat over a comparable period of time (e.g., same or similar period of time), where the second amount of fuel is greater than the first amount of fuel and the second amount of combustion products (and heat) is greater than the first amount of combustion products (and heat). The controller 130 may control a setting of the gas valve 104 to correspond to the first operating mode or the second operating mode. That is, the controller 130 may control the setting of the gas valve 104 to cause the above-described first amount of fuel (e.g., an amount of fuel provided at a first rate) to be directed to the burners 108 in response to initiation of the first stage operating mode, and the controller 130 may control the setting of the gas valve 104 to cause the above-described second amount of fuel (e.g., an amount of fuel provided at a second flow rate greater than the first flow rate) to be directed to the burners 108 in response to initiation of the second operating mode.

The controller 130 may also adjust a speed of the draft inducing fan 126 that, as described above, is configured to bias the combustion products through the heat exchange assembly 113 and to the vent 124. For example, the controller 130 may control the draft inducing fan 126 to run at a first speed corresponding to the first stage operating mode and a second speed corresponding to the second stage operating mode, where the second speed is greater than the first speed. In doing so, heat exchange efficiency may be improved, delays in conditioning the enclosed space serviced by the furnace 100 are reduced, and combustion products are blocked from aggregating in, or causing negative effects to, the heat exchange assembly 113 of the furnace 100. In general, thresholds may define a distinction between first stage operation and second stage operation. For example, providing a first amount of fuel or a first fuel flow rate under a threshold amount or rate may be indicative of first stage operation, and providing a second amount of fuel or a second fuel flow rate above the threshold amount or rate may be indicative of second stage operation. In some embodiments, a ratio may govern first stage operation and second stage operation characteristics. For example, first stage operation may be characterized by a first amount of fuel or fuel flow rate and second stage operation may be characterized by a second amount of fuel or fuel rate, where the first amount of fuel or fuel flow rate is a percentage (e.g., 50%) of the second amount of fuel or fuel flow rate.

As previously described, the controller 130 may determine if and when to initiate second stage operation based on an adaptive staging algorithm that considers characteristics of recent furnace cycles. In accordance with the present disclosure, the term cycle or furnace cycle refers to a time period beginning when operation of the furnace is initiated in response to a first thermostat call and ending when a second thermostat call after the first thermostat call is received.

In the adaptive staging algorithm employed by the controller 130, each previously satisfied call from the thermostat may be associated with a cycle of the two stage furnace that was used to satisfy the call. For example, the controller 130 may be communicatively coupled with a thermostat 132 and configured to receive a call from the thermostat 132. It should be noted that the thermostat 132 may be a wall-mounted device or a handheld device such as a smart phone or some other network-connected device. In general, the thermostat 132 may be configured to receive an input (e.g., via a user interface of the thermostat 132, which may include buttons, a display, a graphic user interface [GUI], or any combination thereof) that sets a desired temperature of the conditioned space, referred to in certain instances as a set-point.

In one embodiment, the thermostat 132 may call for a temperature increase (e.g., a difference between the desired temperature and a current temperature of the conditioned space) of a certain number of degrees (e.g., Fahrenheit, Celsius) in the enclosed space serviced by the furnace 100. The call may be in the form of a value indicative of a desired temperature differential, a value indicative of a desired temperature, a first value indicative of a desired temperature and a second value indicative of a current temperature, or the like. The controller 130 may receive the call from the thermostat 132 and, in response to the call, execute the adaptive staging algorithm to determine a stage up time (e.g., an amount of time during which first stage operation is employed and after which second stage operation is initiated if the call is not satisfied prior to expiration of the stage up time). For example, if the calculated stage up time is 12 minutes, the two stage furnace 100 is controlled to operate in the first stage operating mode for at most 12 minutes, and if the call from the thermostat 132 is not satisfied by the first stage operating mode before or by the time the 12 minutes expire, then the two stage furnace 100 is controlled to operate in the second stage operating mode until the call from the thermostat 132 is satisfied.

The adaptive staging algorithm employed to determine the above-described stage up time may be based at least in part on recent (e.g., previous) cycles of the furnace 100 and whether the recent cycles, which satisfied previous calls from the thermostat 132, required second stage operation. Values assigned to first stage cycles and values assigned to second stage cycles may be employed. A first stage cycle refers to a cycle that was completed without initiating second stage operation. A second stage cycle refers to a cycle that was completed only after initiation of second stage operation (e.g., second stage cycles may include first stage operation and then include second stage operation to satisfy the call from the thermostat 132). Certain of the values assigned to second stage cycles may be greater than certain of the values assigned to first stage cycles. For example, a fifth most recent cycle that corresponds to a second stage cycle may be greater than a fifth most recent cycle that corresponds to a first stage cycle. Further, the values assigned to more recent cycles (e.g., first most recent cycle) may be greater than the values assigned to less recent cycles (e.g., fifth most recent cycle).

The adaptive staging algorithm may include a sum of the values corresponding to each of the most recent cycles (e.g., selected based on whether the cycle included first stage operation only or included second stage operation), which is referred to herein as a weighted sum. Thus, if a most recent cycle was a first stage operating cycle, an appropriate value corresponding to a first most recent first stage operating cycle is assigned, and if a second most recent cycle was a second stage operating cycle, an appropriate value corresponding to a second most recent second stage operating cycle is assigned, and so on and so forth. The various values for recent cycles over the sample size utilized (e.g., five most recent cycles of the furnace 100) are added together to generate the above-described weighted sum. The present disclosure is not limited to a sample size of only the five most recent cycles of the furnace 100. For example, the sample size may be the two most recent cycles, the three most recent cycles, the four most recent cycles, the five most recent cycles, the six most recent cycles, the seventh most recent cycles, and so on and so forth.

The adaptive staging algorithm employs additional features described in detail below with reference to later drawings. However, in general, a result (e.g., output or outcome) of the adaptive staging algorithm may be at least in part a function of the above-described weighted sum. The output or outcome includes a stage up time during which the controller 130 operates the furnace 100 in the first stage operating mode and, if the call from the thermostat 132 is not satisfied prior to the stage up time expiring or lapsing, after which the controller 130 operates the furnace 100 in the second stage operating mode. These and other features are described in detail below with reference to later drawings.

Figure 6:
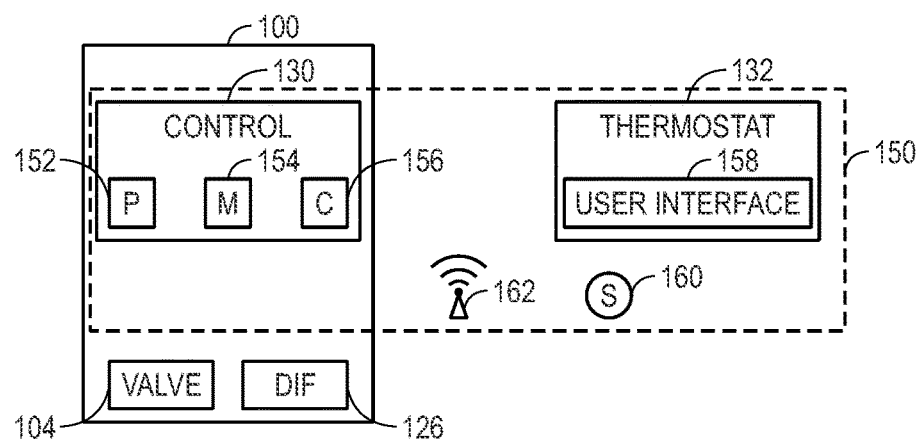
FIG. 6 is a schematic illustration of a control assembly for the furnace of FIG. 5, in accordance with an aspect of the present disclosure.

FIG. 6 is a schematic illustration of an embodiment of a control assembly 150 for the furnace 100 of FIG. 5 (or some other two stage heating or cooling equipment, as previously described). In the illustrated embodiment, the control assembly 150 includes the above-described controller 130, which includes a processor 152, a memory 154 (e.g., non-transitory, computer-readable media having instructions stored thereon), and communication circuitry 156, the above-described thermostat 132, which includes a user interface 158, and a sensor 160 (e.g., a temperature sensor). The memory 154 may include instructions stored thereon that, when executed by the processor 152, cause the controller 130 to perform various functions (e.g., execute an adaptive staging algorithm in accordance with the present disclosure). The controller 130, the thermostat 132, and the sensor 160 may be communicatively coupled via a wired and/or wireless arrangement (e.g., via a network system 162, such as an Internet system). As previously described, the controller 130 may be configured to receive a call from the thermostat 132 (e.g., via the interface 158, which may include buttons, a display, a graphic user interface [GUI], or any combination thereof). In response to receiving the call, the controller 130 may execute an adaptive staging algorithm to determine a stage up time during which the furnace 100 is operated in first stage operation and, if the call is not satisfied prior to the stage up time expiring, after which the furnace 100 is operated in second stage operation to satisfy the call. The sensor 160 may be a temperature sensor that detects a temperature in the space being conditioned by the furnace 100. When the temperature detected by the sensor 160 indicates that the call from the thermostat 132 is satisfied, the controller 130 may control the furnace 100 to stop the cycle (e.g., stop operation of the furnace 100) until another call is received from the thermostat 132.

As previously described, first stage operation (and in some instances second stage operation) may be employed to satisfy the call from the thermostat 132 based on an adaptive staging algorithm executed by the controller 130 for determining a stage up time during which first stage operation is employed and after which second stage operation is employed. During first stage operation, the controller 130 may control the gas valve 104 and the draft inducing fan 126 of the furnace 126 as previously described. For example, the controller 130 may control the gas valve 104 to cause a first fuel flow rate (e.g., a first amount of fuel over a period of time) for providing fuel to the furnace 100 corresponding to the first stage operation. The controller 130 may also control the draft inducing fan 126 to cause a first fan speed for biasing combustion products through the furnace 100 at a first rate corresponding to the first stage operation. Likewise, during the second stage operation, the controller 130 may control the gas valve 104 and the draft inducing fan 126 of the furnace 126 as previously described. For example, the controller 130 may control the gas valve 104 to cause a second fuel flow rate (e.g., a second amount of fuel over a period of time) for providing fuel to the furnace 100 corresponding to the second stage operation. The controller 130 may also control the draft inducing fan 126 to cause a second fan speed for biasing combustion products through the furnace 100 at a second rate corresponding to the first stage operation. In general, the second fuel rate corresponding to the second stage operation may be greater than the first fuel rate corresponding to the first stage operation, and the second fan speed corresponding to the second stage operation may be greater than the first fan speed corresponding to the first stage operation.

The adaptive algorithm outputs the above-described stage up time, which is a function of cycle characteristics of recent cycles of the furnace 100 employed to satisfy recent calls from the thermostat 132. For example, a weighted sum of various values assigned to first stage cycles of the two stage furnace and/or values assigned to second stage cycles of the two stage furnace may be employed via the adaptive staging algorithm. As previously described, a first stage cycle refers to a cycle that is completed (e.g., satisfying a call from the thermostat 132) without initiating second stage operation. A second stage cycle refers to a cycle that is completed (e.g., satisfying a call from the thermostat 132) only after initiating second stage operation (e.g., the second stage cycle may include first stage operation and then second stage operation to satisfy the call).

Certain of the values assigned to second stage cycles may be greater than certain of the values assigned to first stage operation. For example, a fifth most recent cycle that corresponds to a second stage cycle may be greater than a fifth most recent cycle that corresponds to a first stage cycle. Further, the values assigned to more recent cycles (e.g., first most recent cycle) may be greater than the values assigned to less recent cycles (e.g., fifth most recent cycle). The adaptive staging algorithm may include a sum of these values, which is referred to herein as a weighted sum. Thus, if a most recent cycle was a first stage operating cycle, an appropriate value corresponding to a first most recent first stage operating cycle is assigned, and if a second most recent cycle was a second stage operating cycle, an appropriate value corresponding to a second most recent second stage operating cycle is assigned, and so on and so forth. The various values over the sample size utilized (e.g., five most recent cycles of the furnace 100) are added together to generate the above-described weighted sum. The above-described stage up time (i.e., the output or result of the adaptive staging algorithm) is at least in part a function of the weighted sum. The adaptive staging algorithm employs additional features described in detail below with reference to later drawings.

FIG. 7 is an illustration of an embodiment of various tables including values utilized for determining a weighted sum and a weighted percentage based on most recent cycles of, for example, the furnace 100 of FIG. 5. Table 170 and table 180 (or data corresponding to the tables 170 and 180) may be stored to the memory 154 of the controller 130 illustrated in FIG. 6 (or a database communicatively coupled with the controller 130). That is, the table 170 may be a reference table and the table 180 may be a reference table. The table 170 is indicative of values assigned to hypothetical recent first stage cycles. As previously described, a first stage cycle is one in which first stage operation is employed but second stage operation is not employed to satisfy a thermostat call. In the illustrated embodiment, the table 170 includes a value ($A_1$) assigned to a hypothetical fifth most recent first stage cycle, a value ($B_1$) assigned to a hypothetical fourth most recent first stage cycle, a value ($C_1$) assigned to a hypothetical third most recent first stage cycle, a value ($D_1$) assigned to a hypothetical second most recent first stage cycle, and a value ($E_1$) assigned to a hypothetical first most recent first stage cycle. Accordingly, a minimum possible weighted sum, referred to herein as the minimum weighted sum ($WS_{MIN}$), corresponds to a hypothetical scenario where the five most recent cycles are all first stage cycles, and is equal to $A_1+B_1+C_1+D_1+E_1$. In general, more recent cycles are assigned higher values. For example, $E_1$ is greater than $D_1$, $D_1$ is greater than $C_1$, $C_1$ is greater than $B_1$, and $B_1$ is greater than $A_1$. In some embodiments, the values may be multiples. For example, in one embodiment, $E_1$ is two times greater than $D_1$, $D_1$ is two times greater than $C_1$, $C_1$ is two times greater than $B_1$, and $B_1$ is two times greater than $A_1$.

The table 180 is indicative of values assigned to hypothetical recent second stage cycles. As previously described, a second stage cycle is one in which second stage operation is employed (e.g., even if first stage operation is also first employed) to satisfy a thermostat call. That is, the combination of first stage operation and then second stage operation to satisfy a thermostat call is considered a second stage cycle. In the illustrated embodiment, the table 180 includes a value ($A_2$) assigned to a hypothetical fifth most recent second stage cycle, a value ($B_2$) assigned to a hypothetical fourth most recent second stage cycle, a value ($C_2$) assigned to a hypothetical third most recent second stage cycle, a value ($D_2$) assigned to a hypothetical second most recent second stage cycle, and a value ($E_2$) assigned to a hypothetical first most recent second stage cycle. Accordingly, a maximum possible weighted sum, referred to herein as the maximum weighted sum ($WS_{MAX}$), corresponds to a hypothetical scenario where the five most recent cycles are all second stage cycles, and is equal to $A_2+B_2+C_2+D_2+E_2$. The maximum weighted sum is so described, and the minimum weighted sum is so described, because second stage cycles are assigned higher values than first stage cycles on a cycle-by-cycle basis. That is, $A_2$ is great than $A_1$, $B_2$ is great than $B_1$, $C_2$ is great than $C_1$, $D_2$ is great than $D_1$, and $E_2$ is great than $E_1$. In some embodiments, the values may be multiples. For example, in one embodiment, $A_2$ is two times greater than $A_1$, $B_2$ is two times greater than $B_1$, $C_2$ is two times greater than $C_1$, $D_2$ is two times greater than $D_1$, and $E_2$ is two times greater than $E_1$. Further, as previously described with respect to the table 170, the table 180 may assign higher values to more recent cycles. For example, $E_2$ is greater than $D_2$, $D_2$ is greater than $C_2$, $C_2$ is greater than $B_2$, and $B_2$ is greater than $A_2$. In some embodiments, the values may be multiples. For example, in one embodiment, $E_2$ is two times greater than $D_2$, $D_2$ is two times greater than $C_2$, $C_2$ is two times greater than $B_2$, and $B_2$ is two times greater than $A_2$.

Based on the above-described reference tables 170, 180, a weighted sum is calculated in view of the actual most recent cycles of the furnace and whether the actual most recent cycles are first stage cycles or second stage cycles. Table 190 is representative of a weighted sum calculation. For example, the table 190 illustrates a scenario where the fifth most recent cycle was a first stage cycle ($A_1$ from the table 170), a fourth most recent cycle was a first stage cycle ($B_1$ from the table 170), a third most recent cycle was a second stage cycle ($C_2$ from the table 180), a second most recent cycle was a first stage cycle ($D_1$ from the table 170), and a most recent cycle was a second stage cycle ($E_2$ from the table 180). The weighted sum includes a sum of these values. Thus, the weighted sum with respect to the scenario outlined in the table 190 is $A_1+B_1+C_2+D_1+E_1$.

The weighted sum calculated as illustrated above may be included in a calculation of a percentage referred to herein as a weighted percentage. The weighted percentage may be calculated via the following (Equation 1):

Weighted % =

$$\frac{\text{Weighted Sum }(WS) - \text{Minimum Weighted Sum }(WS_{MIN})}{\text{Maximum Weighted Sum }(WS_{MAX}) - \text{Minimum Weighted Sum }(WS_{MIN})}$$

$*100$

The weighted percentage (i.e., "Weighted %" in Equation 1 above) may then be used to calculate a current average weighted percentage. The current average weighted percentage may calculated via the following equation (Equation 2):

Current Average Weighted % =

$$\frac{\text{Previous Average Weighted \% + Weighted \%}}{2}$$

The previous average weighted percentage may be effectively the current average weighted percentage calculated for the most recent previous thermostat call and corresponding most recent furnace cycle that satisfied the most recent previous thermostat call. Because the previous average weighted percentage is based on historical cycles of the furnace extending to an installation of the present adaptive staging algorithm techniques, an initiation sequence, described in detail with reference to later drawings, may be utilized over the first several furnace cycles to accommodate for parameters in the calculations above that would otherwise be missing or incomplete based on a lack of previous cycles to consider. After the initiation sequence, the calculations described above and the additional processing described in detail below (e.g., consulting a reference table based on the calculated current average weighted percentage to locate an appropriate stage up time) are utilized.

Figure 8:
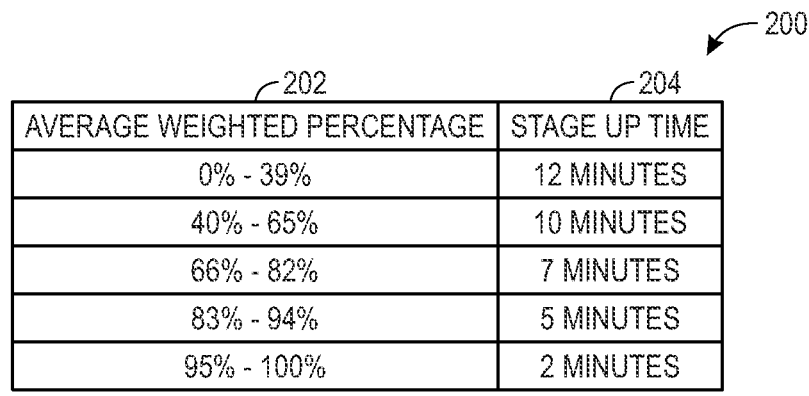
FIG. 8 is an illustration of a table including multiple percent ranges between 0 and 100 and multiple stage up times corresponding to the multiple percent ranges between 0 and 100, for determining a stage up time of the furnace of FIG. 5, accordance with an aspect of the present disclosure.

FIG. 8 is an illustration of an embodiment of a table 200 including multiple percent ranges between 0% and 100% and multiple stage up times corresponding to the multiple percent ranges between 0% and 100%, for determining a stage up time of the furnace utilized to satisfy the pending thermostat call. The illustrated table 200, or data corresponding to, indicative of, or representative of the table 200, may be stored to the memory 154 of the controller 130 illustrated in FIG. 6. In FIG. 8, the table 200 includes a first column 202 having various percent ranges between 0 and 100% (e.g., 0%-39%, 40%-65%, 66%-82%, 83%-94%, and 95%-100%. The illustrated percent ranges are mere examples and may differ in other embodiments. Indeed, a larger number of smaller percent ranges may be included, or a smaller number of larger percent ranges may be included, or the same number of percent ranges may be included but with different ranges (e.g., 0%-45%, 46%-60%, 61%-75%, 76%-85%, and 86%-100%).

The table 200 also includes a second column 204 having stage up times corresponding to each of the percent ranges presented in the first column 202. For example, the second column 204 includes a stage up time of 12 minutes corresponding to the first range of 0%-39%, a stage up time of 10 minutes corresponding to the second range of 40%-65%, a stage up time of 7 minutes corresponding to the third range of 66%-92%, a stage up time of 5 minutes corresponding to the fourth range of 83%-94%, and a stage up time of 2 minutes corresponding to the fifth range of 95%-100%. As previously noted, the current average weighted percentage calculated via Equation 2 may correspond to one of the percent ranges included in the first column 202 of the table 200. For example, if the current average weighted percentage calculated via Equation 2 is 42%, then the current average weighted percentage calculated via Equation 2 corresponds to the second percent range of 40%-65%, which corresponds to a stage up time of 10 minutes in the second column 204 of the table 200. It should be noted that, if the current average weighted percentage calculated via Equation 2 is not a whole number, the current average weighted percentage may be rounded up or down. Additionally or alternatively, the first column 202 of the table 200 may include percent ranges having decimals to more closely connect the percent ranges (e.g., the first percent range may be 0%-39.99%, the second percent range may include 40%-65.99%, the third percent range may include 66%-82.99%, the fourth range may include 83%-94.99%, and the fifth range may include 95%-100%). The stage up time calculated by the controller 130 of FIG. 6 based at least in part on the table 200 of FIG. 8 may then be utilized by the controller 130 of FIG. 6 to determine if and when to stage up from first stage operation to second stage operation to satisfy the thermostat call at issue.

Figure 9:
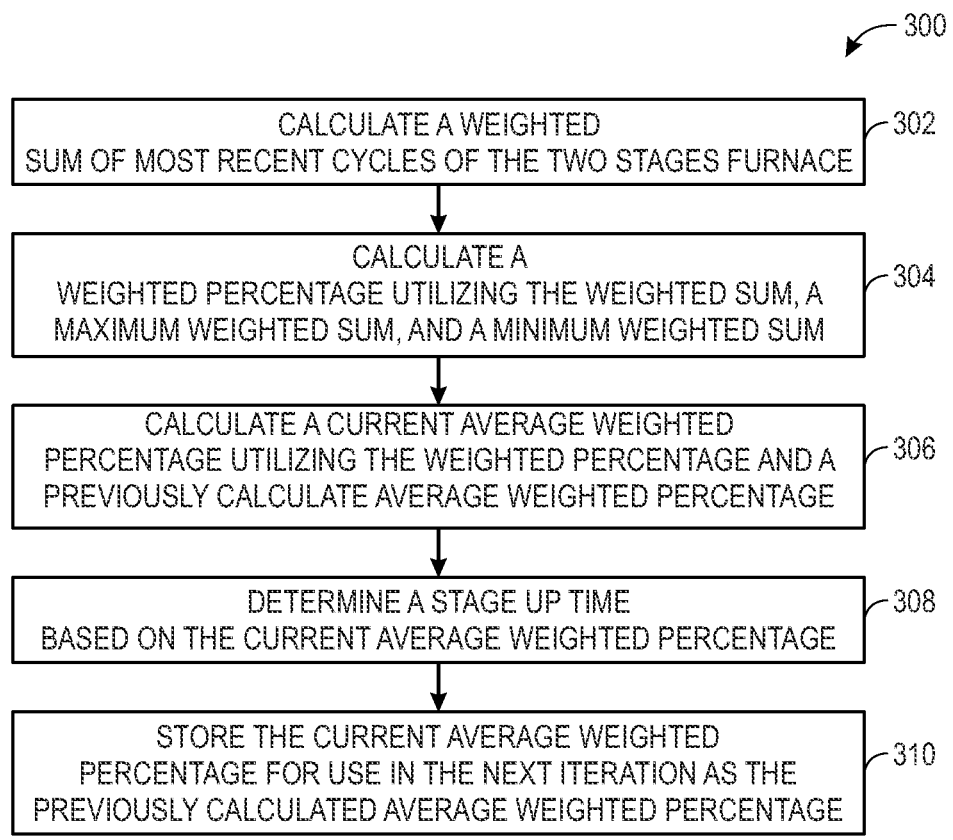
FIG. 9 is a process flow diagram illustrating a method of executing an adaptive algorithm, in accordance with an aspect of the present disclosure.

FIG. 9 is an embodiment of a process flow diagram illustrating a method 300 of executing an adaptive algorithm. In the illustrated embodiment, the method 300 includes calculating (block 302) a weighted sum of most recent cycles of a two stage furnace. The weighted sum may be calculated as described above with respect to FIG. 7. For example, the weighted sum is calculated based on values assigned to most recent cycles of the furnace, the values being dependent on whether each recent cycle at issue is a first stage cycle or a second stage cycle, and then summing the values to arrive at the weighted sum.

The illustrated method 300 also includes calculating (block 304) a weighted percentage utilizing the weighted sum calculated in block 304, a maximum weighted sum, and a minimum weighted sum. For example, the maximum weighted sum is a sum based on a hypothetical scenario in which all of the most recent cycles at issue (e.g., five most recent cycles) are second stage cycles, and the minimum weighted sum is a sum based on a hypothetical scenario in which all of the most recent cycles at issue (e.g., five most recent cycles) are first stage cycles. The weighted percentage, which is a function of the weighted sum, the maximum weighted sum, and the minimum weighted sum, may be calculated based on Equation 1 in the description above.

The illustrated method 300 also calculating (block 306) a current average weighted percentage utilizing the weighted percentage calculated in block 304 and a previous weighted average weighted percentage (i.e., the average weighted percentage calculated for the thermostat call and prior to the thermostat call presently at issue). For example, the current average weighted percentage, as described above, is calculated based on the most recent furnace cycles via Equation 1. The previous average weighted percentage corresponds to the current average weighted percentage calculated for the most recent satisfied thermostat call and corresponding completed furnace cycle. In this way, the previous average weighted percentage is a function of all the recent cycles except for the most recent cycle (i.e., excludes the most recent cycle) and historical furnace cycles prior to the most recent cycles.

The illustrated method 300 also includes determining (block 308) a stage up time based on the current average weighted percentage calculated in block 306. For example, as previously described, a table (i.e., the table 200 of FIG. 8) having various ranges of percentages and corresponding stage up times may be consulted based on the current average weighted percentage. The percent range having the current average weighted percentage includes a corresponding stage up time that is used to control the furnace cycle for satisfying the thermostat call at issue. As previously described, the furnace cycle is operated in first stage operation until either the thermostat call at issue is satisfied or the stage up time expires. If the stage up time expires and the thermostat call at issue has not been satisfied, then second stage operation is initiated until the thermostat call at issue is satisfied. The illustrated method 300 also includes storing (block 310) the current average weighted percentage for use in the next iteration of the adaptive staging algorithm (e.g., the next thermostat call following the thermostat call presently at issue) as the previous average weighted percentage.

Figure 10:
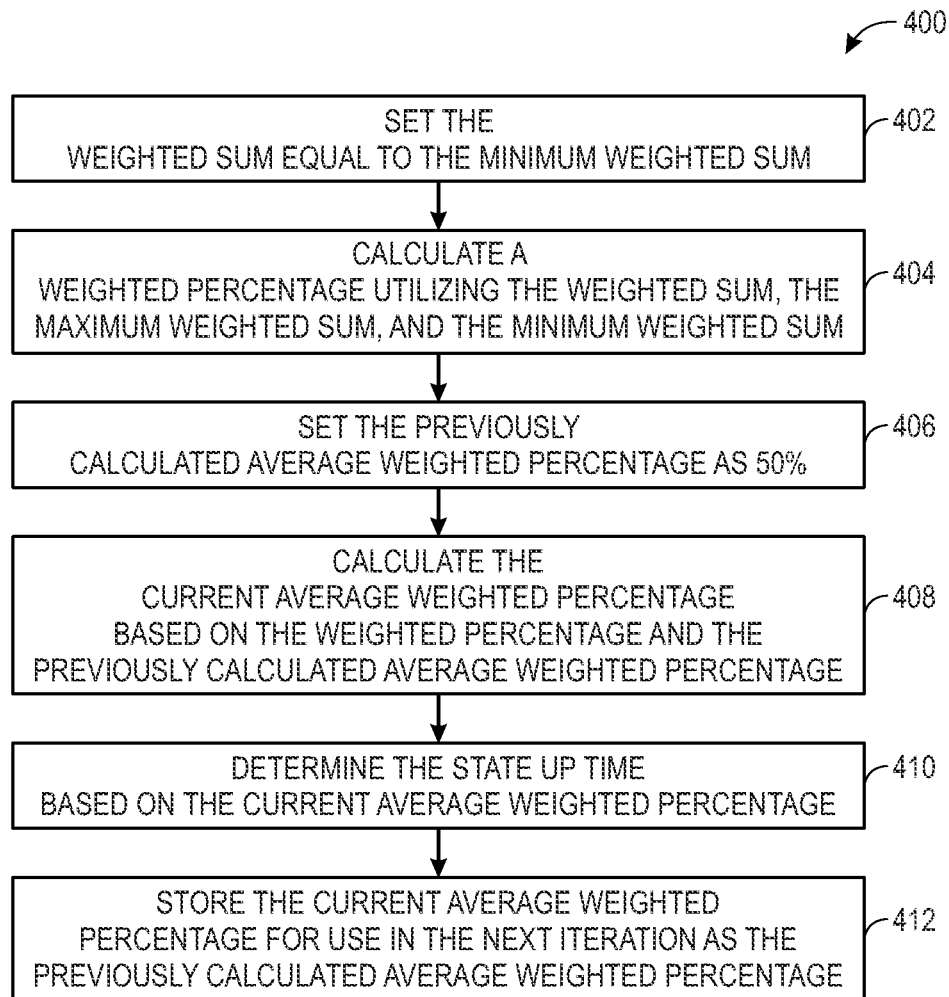
FIG. 10 is a process flow diagram illustrating a method of executing an initiation sequence associated with operation of the furnace of FIG. 5, in accordance with an aspect of the present disclosure.

FIG. 10 is an embodiment of a process flow diagram illustrating a method 400 of executing an initiation sequence associated with initial operation of a furnace and as a part of the above-described adaptive staging algorithm. For example, as previously described, initial operation of the furnace (e.g., immediately after implementation of the control features described herein) may include an initiation sequence that replaces unavailable data points with selected values. In other words, because the adaptive staging algorithm generally considers characteristics of recently completed furnace cycles as part of determining stage up time, and because no such data may exist immediately after the controls scheme disclosed herein is implemented, values may be utilized in place of the characteristics of recently completed furnace cycles.

For example, the method 400 includes setting (block 402) the weighted sum equal to the minimum weighted sum. That is, to calculate the weighted sum, the adaptive staging algorithm selects first stage operating values for each hypothetical recent furnace cycle being included in the weighted sum. Accordingly, the weighted sum is equal to the minimum weighted sum. In a different embodiment, the adaptive staging algorithm may select second stage operating values for each hypothetical recent furnace cycle being included in the weighted sum. The method 400 also includes calculating (block 404) the weighted percentage utilizing the weighted sum (e.g., set to the minimum weighted sum), the minimum weighted sum, and the maximum weighted sum.

The method 400 also includes setting (block 406) the previously calculated weighted percentage as 50%. For example, because the adaptive algorithm has not yet, a previously calculated weighted percentage has not been determined. Accordingly, the previously calculated weighted percentage is set to 50%. In a different embodiment, the previously calculated weighted percentage may be set to a different percentage for this very first cycle, such as 25% or 75%.

The method 400 also includes calculating (block 408) the average weighted percentage based on the weighted percentage and the previous average weighted percentage (e.g., where the previous average weighted percentage is set to 50%, as noted above). The equations associated with the various calculations at issue in blocks 408 and 404 are described in detail above with reference to earlier drawings.

The method 400 also includes determining (block 410) the stage up time based on the current average weighted percentage calculated at block 408. For example, the table 200 illustrated in FIG. 8 is utilized to cross-reference the current average weighted percentage with a corresponding stage up time. The method 400 also includes storing (block 412) the current average weighted percentage for use in the next iteration as the previous average weighted percentage.

After block 412, the adaptive staging algorithm need not set a value for the previous average weighted percentage in the next iteration. However, the furnace will have been operated via the controls scheme described herein for only one cycle, and the adaptive staging algorithm may be generally configured to consider first stage or second stage characteristics of multiple recent cycles (e.g., the five most recent cycles). Accordingly, while the most recent cycle is known to be either a first stage cycle or second stage cycle, no other recent cycles have actually been completed. The adaptive staging algorithm may assign first stage cycle values for the other hypothetical recent cycles that have not actually occurred. That is, the most recent cycle may be a first stage or second stage cycle depending on whether second stage operation is required to satisfy the previous thermostat call, whereas the second most recent cycle, the third most recent cycle, the fourth most recent cycle, etc. are simply set by the adaptive staging algorithm as first stage cycles for purposes of calculating the weighted sum in the next iteration (e.g., next thermostat call and furnace cycle). This process may be repeated until enough cycles have been completed to operate the adaptive staging algorithm as described with reference to FIGS. 5-9 above.

The present disclosure may provide one or more technical effects useful in the operation of an HVAC system. For example, the disclosed controls scheme employing the disclosed adaptive staging algorithm may improve efficiency of a two stage heat exchanger, a timeliness of conditioning an environment (e.g., enclosed space) via the two stage heat exchanger, and an interface between the two stage heat exchanger and thermostats, such as a single call thermostat.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A heating, ventilation, and/or air conditioning (HVAC) system, comprising:
    a two stage heat exchanger; and
    a controller configured to receive a call from a thermostat and, in response to receiving the call:
        determine whether a recent cycle of the two stage heat exchanger ended as a first stage cycle or ended as a second stage cycle;
        select a value from a first value and a second value, the first value corresponding to the recent cycle of the two stage heat exchanger ending as the first stage cycle, the second value corresponding to the recent cycle of the two stage heat exchanger ending as the second stage cycle, and the first value being different than the second value;
        determine a stage up time of the two stage heat exchanger based at least in part on a weighted percentage, wherein the weighted percentage is based at least in part on a numerator comprising a minimum weighted sum and a weighted sum therein and a denominator comprising the minimum weighted sum and a maximum weighted sum therein, the weighted sum is based at least in part on a plurality of values corresponding to a plurality of recent cycles of the two stage heat exchanger, the plurality of recent cycles includes the recent cycle, and the plurality of values includes the value;
        control the HVAC system to initiate a first stage operation of the two stage heat exchanger; and
        control, in response to the call from the thermostat not being satisfied by the first stage operation once the stage up time lapses, the HVAC system to perform a second stage operation of the two stage heat exchanger until the call from the thermostat is satisfied.

2. The HVAC system of claim 1, wherein the controller is configured to receive the call from the thermostat and, in response to receiving the call:
    determine whether an additional recent cycle of the two stage heat exchanger ended as an additional first stage cycle or an additional second stage cycle, wherein the plurality of recent cycles includes the additional recent cycle; and
    select an additional value from a third value and a fourth value, the third value corresponding to the additional recent cycle of the two stage heat exchanger ending as the additional first stage cycle, the fourth value corresponding to the additional recent cycle of the two stage heat exchanger ending as the additional second stage cycle, and the third value being different than the fourth value, wherein the plurality of values includes the additional value.

3. The HVAC system of claim 2, wherein the recent cycle occurred more recently than the additional recent cycle, the first value is greater than the third value, and the second value is greater than the fourth value.

4. The HVAC system of claim 1, wherein the minimum weighted sum corresponds to a first hypothetical plurality of values reflective of all recent cycles of the plurality of recent cycles being first stage cycles, and the maximum weighted sum corresponds to a second hypothetical plurality of values reflective of all recent cycles of the plurality of recent cycles being second stage cycles.

5. The HVAC system of claim 1, wherein the controller is configured to determine the weighted percentage by:
    dividing the numerator comprising the minimum weighted sum subtracted from the weighted sum by the denominator comprising the minimum weighted sum subtracted from the maximum weighted sum to output a figure; and
    multiplying the figure by 100 to output the weighted percentage.

6. The HVAC system of claim 1, wherein the controller is configured to receive the call from the thermostat and, in response to receiving the call, determine the stage up time of the two stage heat exchanger based at least in part on current average weighted percentage by:
- summing the weighted percentage with a previous average weighted percentage to output a result; and
- dividing the result by two to output the current average weighted percentage.

7. The HVAC system of claim 6, wherein the controller is configured to receive the call from the thermostat and, in response to receiving the call, determine the stage up time of the two stage heat exchanger based at least in part on the current average weighted percentage by:
- locating, in a plurality of ranges of percentages, a range of percentages under which the current average weighted percentage falls; and
- determine the first stage up time of the two stage heat exchanger based on the range.

8. The HVAC system of claim 1, wherein the recent cycle is one of five most recent cycles of the two stage heat exchanger.

9. A two stage heat exchanger, comprising:
a valve; and
processing circuitry configured to:
- receive a call from a thermostat;
- determine, in response to the call, whether a recent cycle of the two stage heat exchanger ended as a first stage cycle or ended as a second stage cycle;
- determine a stage up time of the two stage heat exchanger based at least in part on a weighted percentage, wherein the weighted percentage is based at least in part on a numerator comprising a minimum weighted sum and a weighted sum therein and a denominator comprising the minimum weighted sum and a maximum weighted sum therein, the weighted sum is based at least in part on a plurality of values corresponding to a plurality of recent cycles of the two stage heat exchanger, the plurality of recent cycles includes the recent cycle, the plurality of values includes either a first value in response to the recent cycle ending as the first stage cycle or a second value in response to the recent cycle ending as the second stage cycle, and the second value is different than the first value;
- control the valve to initiate a first stage operation of the two stage heat exchanger; and
- control, in response to the call from the thermostat not being satisfied by the first stage operation once the stage up time lapses, the valve to perform a second stage operation of the two stage heat exchanger until the call from the thermostat is satisfied.

10. The two stage heat exchanger of claim 9, wherein the processing circuitry is configured to determine, in response to the call, whether an additional recent cycle of the two stage heat exchanger ended as an additional first stage cycle or ended as an additional second stage cycle, the recent cycle occurring more recently than the additional recent cycle, wherein the plurality of values includes either a third value in response to the additional recent cycle ending as the additional first stage cycle or a fourth value in response to the additional recent cycle ending as the additional second stage cycle, wherein the fourth value is different than the third value, the first value is greater than the third value, and the second value is greater than the fourth value.

11. The two stage heat exchanger of claim 9, wherein the minimum weighted sum corresponds to a first hypothetical plurality of values reflective of all recent cycles of the plurality of recent cycles being first stage cycles, and the maximum weighted sum corresponds to a second hypothetical plurality of values reflective of all recent cycles of the plurality of recent cycles being second stage cycles.

12. The two stage heat exchanger of claim 9, wherein the processing circuitry is configured to determine the stage up time of the two stage heat exchanger based at least in part on a current average weighted percentage by:
- summing the weighted percentage with a previous average weighted percentage to output a result; and
- dividing the result by two to output the current average weighted percentage.

13. The two stage heat exchanger of claim 12, wherein the processing circuitry is configured to determine, in response to the call, the stage up time of the two stage heat exchanger based at least in part on the current average weighted percentage by:
- locating, in a plurality of ranges of percentages, a range of percentages under which the current average weighted percentage falls; and
- determine the stage up time of the two stage heat exchanger based on the range.

14. The two stage heat exchanger of claim 9, wherein the recent cycle is one of five most recent cycles of the two stage heat exchanger.

15. The two stage heat exchanger of claim 9, wherein the processing circuitry is configured to determine the weighted percentage by:
- dividing the numerator comprising the minimum weighted sum subtracted from the weighted sum by the denominator comprising the minimum weighted sum subtracted from the maximum weighted sum to output a figure; and
- multiplying the figure by 100 to output the weighted percentage.

16. One or more tangible, non-transitory, computer-readable media storing instructions thereon that, when executed by processing circuitry, are configured to cause the processing circuitry to:
- receive a call from a thermostat corresponding to a two stage heat exchanger;
- determine whether a most recent cycle of the two stage heat exchanger satisfied a previous call from the thermostat via only a first stage cycle or via a second stage cycle;
- select, in response to the call, a value from a first value and a second value, the first value corresponding to a first determination that the most recent cycle of the two stage heat exchanger satisfied the previous call from the thermostat via only the first stage cycle, and the second value corresponding to a second determination that the most recent cycle satisfied the previous call from the thermostat via the second stage cycle;
- determine a stage up time of the two stage heat exchanger based at least in part on a weighted percentage, wherein the weighted percentage is based at least in part on a numerator comprising a minimum weighted sum and a weighted sum therein and a denominator comprising the minimum weighted sum and a maximum weighted sum therein, the weighted sum is based at least in part on a plurality of values corresponding to a plurality of recent cycles of the two stage heat exchanger, the plurality of recent cycles includes the most recent cycle, and the plurality of values includes the value;
- control the two stage heat exchanger to initiate a first stage operation; and control, in response to the call from the thermostat not being satisfied by the first stage operation once the stage up time lapses, the two stage heat exchanger to perform a second stage operation until the call from the thermostat is satisfied.

17. The one or more tangible, non-transitory, computer-readable media of claim 16, wherein the instructions, when executed by the processing circuitry, are configured to cause the processing circuitry to:
  determine whether a second most recent cycle of the two stage heat exchanger satisfied an additional previous call from the thermostat via only an additional first stage cycle or via an additional second stage cycle; and
  select, in response to the call, an additional value from a third value and a fourth value, the third value corresponding to a third determination that the second most recent cycle of the two stage heat exchanger satisfied the additional previous call from the thermostat via only the additional first stage cycle, and the fourth value corresponding to a fourth determination that the second most recent cycle satisfied the additional previous call from the thermostat via the additional second stage cycle, wherein the first value is greater than the third value, and the second value is greater than the fourth value, wherein the plurality of recent cycles includes the most recent cycle and the second most recent cycle, and the plurality of values includes the value and the additional value.

18. The one or more tangible, non-transitory, computer-readable media of claim 16, wherein the minimum weighted sum corresponds to a first hypothetical plurality of values reflective of all recent cycles of the plurality of recent cycles being first stage cycles, and the maximum weighted sum corresponds to a second hypothetical plurality of values reflective of all recent cycles of the plurality of recent cycles being second stage cycles.

19. The one or more tangible, non-transitory, computer-readable media of claim 16, wherein the instructions, when executed by the processing circuitry, are configured to cause the processing circuitry to determine the stage up time of the two stage heat exchanger based at least in part on a range of percentages by:
  determining a current average weighted percentage by summing a previous average weighted percentage with the weighted percentage and dividing by two;
  determining, from a plurality of ranges of percentages, the range of percentages under which the current average weighted percentage falls; and
  determining the stage up time based at least in part on the range.

20. The one or more tangible, non-transitory, computer-readable media of claim 16, wherein the instructions, when executed by the processing circuitry, are configured to cause the processing circuitry to determine the weighted percentage by:
  dividing the numerator comprising the minimum weighted sum subtracted from the weighted sum by the denominator comprising the minimum weighted sum subtracted from the maximum weighted sum to output a figure; and
  multiplying the figure by 100 to output the weighted percentage.

* * * * *